Patented June 19, 1923.

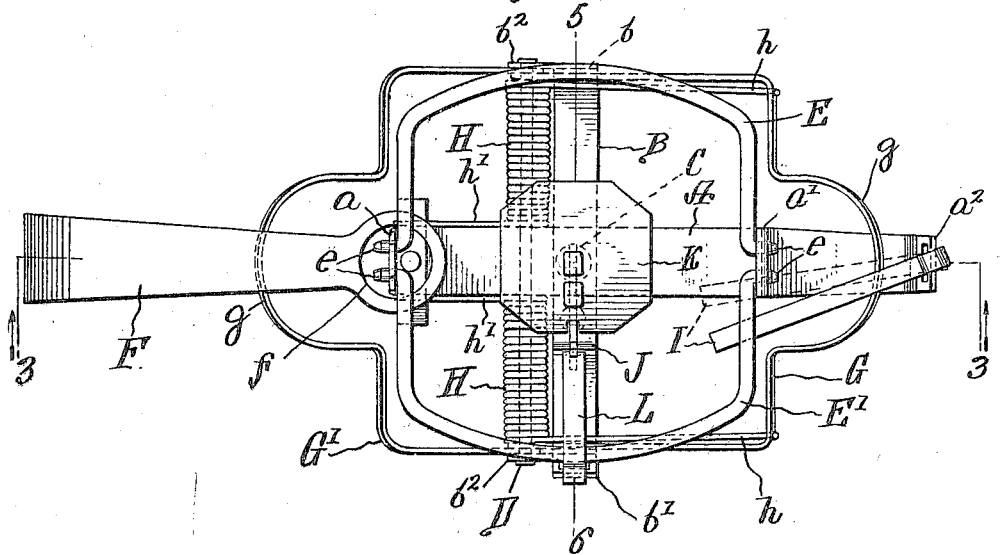
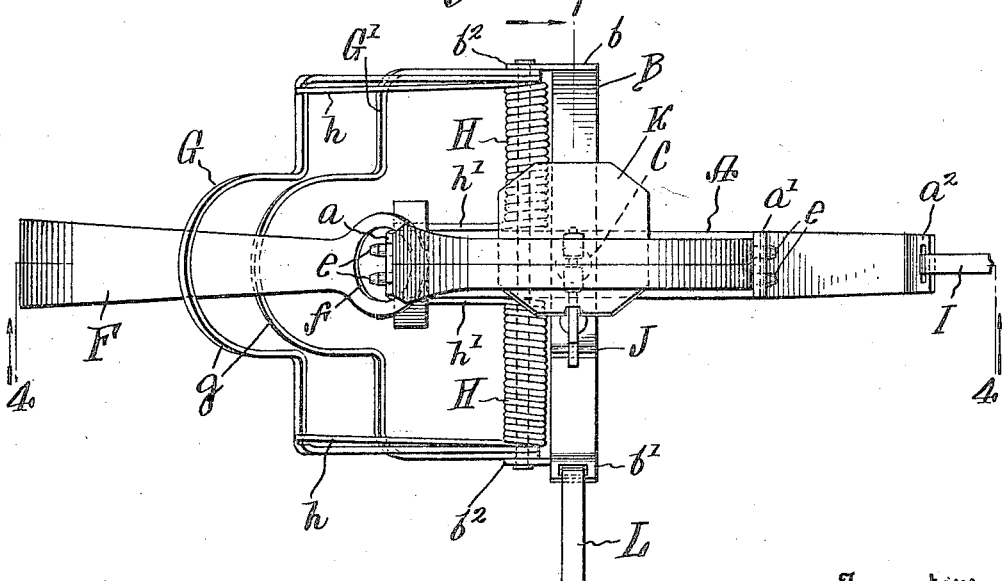

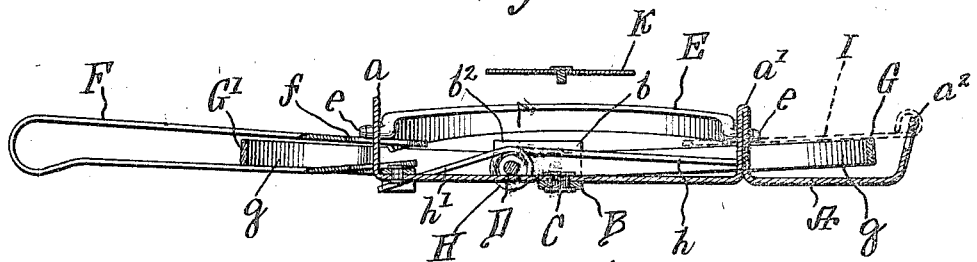
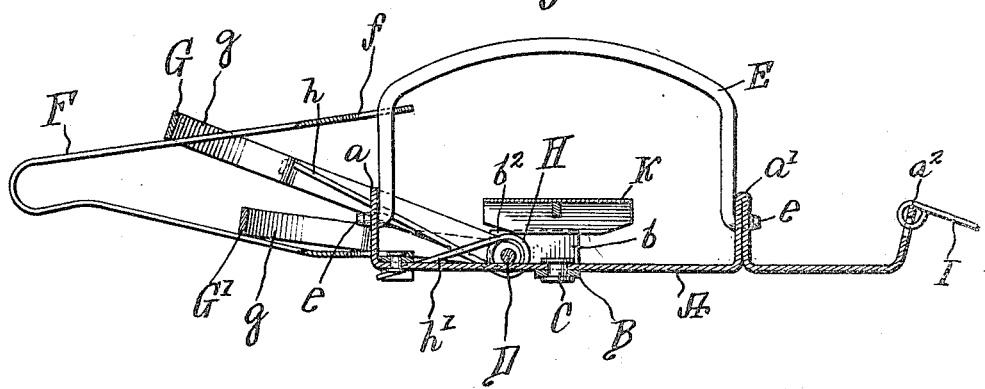
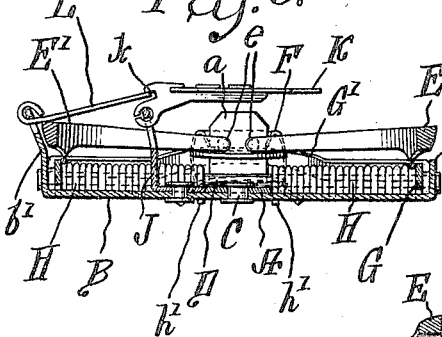
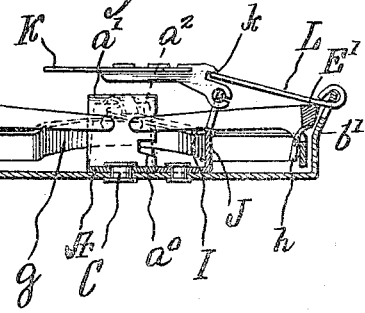
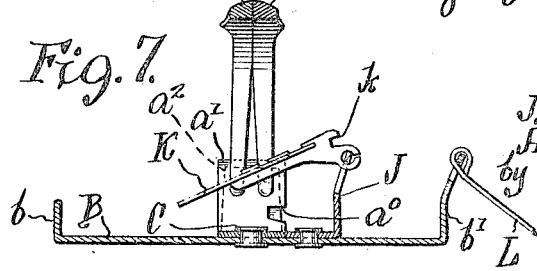

1,459,661

UNITED STATES PATENT OFFICE.

JOSEPH D. GRAVOLET AND ADAM ANSARDI, OF PHOENIX, LOUISIANA.

ANIMAL TRAP.

Application filed October 7, 1922. Serial No. 592,995.

*To all whom it may concern:*

Be it known that we, JOSEPH D. GRAVOLET and ADAM ANSARDI, citizens of the United States, residing at Phoenix, in the parish of Plaquemines and State of Louisiana, have invented certain new and useful Improvements in Animal Traps, of which the following is a specification.

Our invention relates to improvements in spring traps for trapping animals of various kinds, more especially small animals such as rats, coons, rabbits, muskrats, or the like.

The invention is especially intended to provide a trap which will securely hold the animal and will prevent it from twisting off its leg by stirring around or "whirling" as it is called; or to prevent it from gnawing off the leg at the place where the leg is held by the gripping springs. A great many animals caught in traps manage to effect their release in the manner stated, leaving a foot or feet in the trap.

For the purposes aforesaid the invention provides the usual spring operated gripping jaws for catching the animal by the leg or legs as it springs the trap, and a pair of auxiliary spring pressed bows for seizing the imprisoned animal by the body and holding it against swinging around laterally in the trap, and also holding its head away from the imprisoned leg or legs, and preventing the animal from gnawing off said leg or legs.

The invention comprises an all metal trap of cheap and efficient construction, durable and not apt to get out of order.

The invention will be more fully understood after reference to the accompanying drawings, in which like parts are indicated by similar reference symbols throughout the several views, and in which:—

Figure 1 is a plan view showing the trap when set, with the gripping jaws open.

Figure 2 is a similar view showing the trap when sprung.

Figure 3 shows a section along the line 3—3 of Fig. 1, and looking in the direction of the arrows, parts being shown in elevation.

Figure 4 shows a section along the line 4—4 of Fig. 2, and looking in the direction of the arrows, parts being shown in elevation.

Figure 5 shows a section along the line 5—6 of Fig. 1, looking to the left.

Figure 6 shows the same section as in Fig. 5, but looking to the right; and

Figure 7 shows a section along the line 7—7 of Fig. 2, and looking in the direction of the arrows.

In Figures 5, 6 and 7 certain parts are shown in elevation.

The trap comprises a main frame, preferably in the shape of a cross, having the longitudinal strip A provided with the upwardly projecting flanges $a$, $a'$ and $a^2$. This longitudinal strip A is preferably made of a single piece as shown most clearly in Fig. 4.

Secured transversely to this longitudinal strip is the cross piece B which may be secured to the strip A in any convenient way, as by means of the rivet C, see Fig. 4. This cross piece B has its ends upturned, as at $b$ and $b'$, each end being provided with a laterally projecting lug $b^2$ to serve as a journal bearing for the bolt D, which will be hereinafter more fully described.

E and E' are the ordinary gripping jaws preferably made in the usual bow form, and each having its free ends $e$ bent to form pivots engaging in bearings in the flanged portions $a$ and $a'$, respectively, of the longitudinal strip A.

F represents a U-spring provided with an eye $f$ to engage the gripping jaws E and E', as shown most clearly in Fig. 1. This spring is secured to the main frame in any convenient way.

G and G' are two bow-shaped body jaws which are preferably looped, as at $g$, see Figs. 1, 2 and 4, and have their ends pivoted upon the rod D which forms a part of the main frame. The jaw G' is loosely pivoted on this rod and has its looped end projecting between the arms of the U-spring F. The jaw G is normally pressed to the sprung position, shown in Fig. 4, by means of the coil springs H, one end $h$ of each of which springs engages this jaw, and the other end $h'$ engages part of the framework as shown in Figs. 1, 3 and 4. Two of these springs are shown in Fig. 1, but obviously a single spring would suffice. The tendency of these springs is to return the jaw G to the sprung position shown in Figs. 2 and 4, so that the body of the animal may be gripped between said jaws.

The body jaw G' normally projects into the loop of the spring F, and the body jaw G is normally held against the top of the loop spring F when the trap is not set, or in the released position, as shown in Fig. 4. When the trap is set the jaw G is swung over from the position shown in Fig. 4 to the position shown in Fig. 3, and the latch I, pivoted as at $a^2$ to the main frame, see Fig. 4 may be used to temporarily hold this jaw in place by swinging said latch into the notch $a°$ of the strip A, which is shown most clearly in Fig. 6.

J represents a bracket secured to the main frame, to which the tripping platform K is pivoted, as shown most clearly in Figs. 5, 6 and 7. This platform is provided with a notch $k$ to engage the latch L and hold the platform in the raised position when the trip is set, as shown in Figs. 3, 5 and 6. This latch L is normally pressed upwards to the position shown in Figs. 5 and 6 by the upward pressure of the jaw E', as shown in Figs. 1, 5 and 6.

The operation of the device is as follows: Suppose the trap to be sprung, the parts will then be in the position shown in Figs. 2, 4 and 7. To set the trap, swing over the body jaw G from the position shown in Fig. 4 to the position shown in Figs. 1 and 3, and swing the latch I to engage in the notch $a°$. This will hold the body jaw G in the open position. Now press down on the loop spring F and spread the jaws E and E' and insert the latch L in the notch $k$ of the tripping platform K.

Then, ease the latch I out of engagement with the notch $a°$, swinging same from the position shown in dotted lines in Fig. 1 to the position shown in full lines in Fig. 1; then the trap will be completely set, the parts being in the position shown in full lines in Fig. 1.

It will be noted that the latch I need only be used in setting the trap, for after the jaws E and E' have been secured in the "set" position, as shown in Fig. 1, and held in that position by the latch L, these two jaws E and E' will hold the body jaw G down in the set position shown in Fig. 1.

The platform may be baited, or the trap may be simply set in the path of the animal, as preferred. When the animal places part of its weight on the platform K, the notch $k$ will be released from engagement with the latch L and the gripping jaws E and E' will be swung together under the action of the loop spring F. As soon as these jaws E and E' spring upwards, the body jaw G will be set free and will swing the latch I up out of the way, and the body jaw G will swing over under the action of the springs H from the position shown in Fig. 1 to the position shown in Fig. 2. When the trap is sprung, the parts will be in the position shown in Figs. 2, 4 and 7.

It will be noted that if the latch I be held in engagement with the notch $a°$ the gripping jaws E and E' will still function when the trap is sprung, but the body jaw G will not move, and it may be desired to use the trap in this way under certain conditions; but normally it would be preferable to have two pairs of jaws cooperate in the manner just described.

It will be obvious that by varying the dimensions and strength of the parts the trap constructed as hereinbefore described may be made large enough to catch large animals, or small enough to catch small animals. In practice there should preferably be several sizes of traps for the different uses for which they are employed.

Any suitable fastening chain or other device may be used to secure the trap to a stake, sapling, or the like, to prevent the animal dragging it away; but there is little danger of this from the fact that the animal will be securely held in the trap by the double system of gripping jaws herein described.

It will be obvious that various modifications might be made in the herein described construction, and in the combination and arrangement of parts which could be used without departing from the spirit of our invention; and we do not mean to limit the invention to such details except as particularly pointed out in the claims.

Having thus described our invention what we claim and desire to secure by Letters Patent of the United States is:—

1. An animal trap comprising a main frame, a pair of gripping jaws pivoted thereto, a U spring normally swinging said jaws to the gripping position, a pair of body jaws pivoted on said frame transversely to said gripping jaws, one of said body jaws being shorter than the other and being loosely pivoted on said frame and having its looped portion projecting between the members of said U spring, and the other body jaw being arranged to swing over said gripping jaws when said gripping jaws are in the sprung position, but to be held down by said gripping jaws when the trap is set, coil springs for swinging said last mentioned body jaw to the sprung position, a latch for holding said gripping jaws in the open or set position, and a pivoted platform adapted to be tilted by the animal for releasing said latch and said gripping jaws, and thereby releasing the last mentioned body jaw.

2. An animal trap comprising a main frame, a pair of gripping jaws pivoted thereto, a U spring normally swinging said jaws to the gripping position, a pair of body jaws pivoted on said frame transversely to said gripping jaws, said body jaws being each provided with D-shaped looped central portions, one of said body jaws being shorter than the other and being loosely pivoted on said frame and having its looped portion projecting between the members of said U spring, and the other body jaw being arranged to swing over said gripping jaws when said gripping jaws are in the sprung position, but to be held down by said gripping jaws when the trap is set, coil springs for swinging said last mentioned body jaw to the sprung position, a latch for holding said gripping jaws in the open or set position, and a pivoted platform adapted to be tilted by the animal for releasing said latch and said gripping jaws, and thereby releasing the last mentioned body jaw.

J. D. GRAVOLET.
ADAM ANSARDI.